(12) United States Patent
Johnson et al.

(10) Patent No.: US 6,238,711 B1
(45) Date of Patent: May 29, 2001

(54) CHEWING GUM WITH INCREASED FLAVOR RELEASE USING AN ALIGINATE MATERIAL AND METHOD OF MAKING

(75) Inventors: Sonya S. Johnson, La Grange Highlands; Carmen V. Howard, Alsip, both of IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/434,946

(22) Filed: Nov. 5, 1999

Related U.S. Application Data

(60) Provisional application No. 60/109,935, filed on Nov. 25, 1998.

(51) Int. Cl.$^7$ ........................................... A23G 3/30
(52) U.S. Cl. .................................................. 426/3
(58) Field of Search ............................... 426/3, 5

(56) References Cited

U.S. PATENT DOCUMENTS

| | | | |
|---|---|---|---|
| 3,857,964 | * 12/1974 | Yolles | 426/3 |
| 3,930,026 | * 12/1975 | Clark | 426/3 |
| 4,065,578 | * 12/1977 | Reggio et al. | 426/3 |
| 4,156,740 | * 5/1979 | Glass et al. | 426/3 |
| 4,528,205 | 7/1985 | Turrisi | 426/613 |
| 4,695,463 | 9/1987 | Yang et al. | 424/440 |
| 4,775,525 | 10/1988 | Pera | 424/58 |
| 4,802,924 | 2/1989 | Woznicki et al. | 427/3 |
| 4,981,698 | * 1/1991 | Cherukuri et al. | 426/3 X |
| 5,002,785 | 3/1991 | Lew | 426/303 |
| 5,128,155 | 7/1992 | Song et al. | 426/5 |
| 5,139,794 | 8/1992 | Patel et al. | 426/3 |
| 5,154,927 | 10/1992 | Song et al. | 424/440 |
| 5,192,563 | 3/1993 | Patel et al. | 426/5 |
| 5,192,802 | 3/1993 | Rencher | 514/535 |
| 5,194,288 | 3/1993 | Peterson | 426/658 |
| 5,221,502 | 6/1993 | Washington | 264/171 |
| 5,227,182 | 7/1993 | Song et al. | 426/5 |
| 5,324,531 | 6/1994 | Hoefler et al. | 426/573 |
| 5,326,574 | 7/1994 | Chapdelaine et al. | 426/5 |
| 5,462,749 | 10/1995 | Rencher | 424/484 |

FOREIGN PATENT DOCUMENTS

| | | |
|---|---|---|
| 0 311 985 A2 | 4/1989 | (EP) . |
| 0 320 522 A1 | 6/1989 | (EP) . |
| 0 427 796 B1 | 4/1990 | (EP) . |
| 0 437 360 A1 | 7/1991 | (EP) . |
| 0 437 927 A2 | 7/1991 | (EP) . |
| 0 452 262 A2 | 10/1991 | (EP) . |
| 0 492 981 B1 | 7/1992 | (EP) . |
| 0 533 815 B1 | 3/1993 | (EP) . |
| 0 784 937 A1 | 7/1997 | (EP) . |
| 102289 | 4/1995 | (JP) . |
| 102290 | 4/1995 | (JP) . |
| 0 221 850 A3 | 5/1987 | (WO) . |
| WO 93/17569 | 9/1993 | (WO) . |
| WO 94/01002 | 1/1994 | (WO) . |
| WO 94/14330 | 7/1994 | (WO) . |
| WO 98/27826 | 7/1998 | (WO) . |

OTHER PUBLICATIONS

Hawley, *The Condensed Chemical Dictionary*, 9$^{th}$, pp. 48,149,727,783, 1977.*

* cited by examiner

Primary Examiner—Arthur L. Corbin
(74) Attorney, Agent, or Firm—Steven P. Shurtz; Brinks Hofer Gilson & Lione

(57) ABSTRACT

The present invention is a method of increasing the flavor release of chewing gum using an alginate material, as well as the chewing gum containing the alginate material and having increased flavor release. The increase in flavor release is obtained by incorporating the alginate material in a powder form (without having been used as a coating material) directly into the chewing gum composition. The alginate material is selected from the group consisting of sodium alginate, carrageenan from red seaweed, propylene glycol alginate, sodium calcium alginate, ammonium alginate, calcium alginate and mixtures thereof.

19 Claims, No Drawings

CHEWING GUM WITH INCREASED FLAVOR RELEASE USING AN ALGINATE MATERIAL AND METHOD OF MAKING

REFERENCE TO EARLIER FILED APPLICATION

The present application claims the benefit of the filing date under 35 U.S.C. §119(e) of Provisional U.S. Patent Application Serial No. 60/109,935 filed Nov. 25, 1998, which is hereby incorporated by reference.

FIELD OF THE INVENTION

This invention relates generally to chewing gum products and, in particular, to chewing gum products which utilize an alginate material to increase the flavor release in chewing gum compositions.

BACKGROUND OF THE INVENTION

In prior art patents, sodium alginate, carrageenan, propylene glycol alginate, and sodium calcium alginate, along with a variety of other carbohydrate gums, are used as a film coating media for a variety of encapsulated products and are disclosed with other water soluble gums as an encapsulating media. Many prior art patents disclose sweeteners, flavors, and other ingredients encapsulated with alginates and other carbohydrate gums, and used in chewing gum to modify release of the encapsulated material.

Chewing gum compositions typically include gum base, flavoring and bulking and sweetening agents, as well as other optional ingredients such as softeners and coloring. As gum is chewed for an extended period of time, the taste sensation is reduced, thereby resulting in the impression that the gum has lost most of its flavor. In reality, most of the original flavor, about 70 to about 90 percent, is still present in the chewing gum. A need, therefore, exists for a method of increasing the amount of flavor released from chewing gum compositions as they are chewed over a period of time.

SUMMARY OF THE INVENTION

According to the present invention, it has now been discovered that the use of low levels of an alginate material selected from the group consisting of sodium alginate, carrageenan from red seaweed, propylene glycol alginate, sodium calcium alginate, ammonium alginate, calcium alginate and mixtures thereof in chewing gum increases the amount of flavor released from the chewing gum, resuming in the impression of a stronger flavor. Analytical tests have shown that levels of about 0.2 percent of one of these alginate materials in mint-flavored gum significantly increases the release rate of menthol and menthone. The result is a chewing gum product with a stronger mint flavor. Also, the increase in the flavor release when one of the alginate materials is used in chewing gum means that less flavor is needed to give the impression of the usual flavor level.

The present Invention thus includes a chewing gum product having increased flavor release comprising from about 5% to about 90% by weight gum base; from about 5% to about 95% by weight bulking and sweetening agents; from about 0.1% to about 15% by weight flavor; and from about 0.01% to about 1% by weight of an alginate material selected from the group consisting of sodium alginate, carrageenan from red seaweed, propylene glycol alginate, sodium calcium alginate, ammonium alginate, calcium alginate and mixtures thereof in a powder form. The present invention also includes a method of increasing the release of flavor in chewing gum compositions comprising the step of adding one of the alginate materials to the chewing gum composition. Finally, the present invention includes a method of making a chewing gum product having an increased flavor release comprising the steps of forming a chewing gum composition comprising from about 5% to about 90% gum base, from about 5% to 95% bulking and sweetening agents and from about 0.1% to about 15% flavor, and adding from about 0.01% to about 1% of an alginate material selected from the group consisting of sodium alginate, carrageenan from red seaweed, propylene glycol alginate, sodium calcium alginate, ammonium alginate, calcium alginate and mixtures thereof in a powder form directly to the chewing gum composition.

The foregoing and other features and advantages will become apparent from the following detailed description of the presently preferred embodiments, when read in conjunction with the accompanying examples.

DETAILED DESCRIPTION OF THE PRESENTLY PREFERRED EMBODIMENTS

As used herein, the term "chewing gum" includes all types of gum compositions, including sugar and sugarless chewing gum, bubble gum and the like.

All percentages used herein are weight percentages unless otherwise specified.

In general, a chewing gum composition typically comprises a water-soluble bulk portion, a water-insoluble chewable gum base portion and one or more water-insoluble flavoring agents. The water-soluble portion dissipates with a portion of the flavoring agent over a period of time during chewing. The gum base portion is retained in the mouth throughout the chewing process.

The insoluble gum base generally includes elastomers, elastomer plasticizers (resins), fats and oils, waxes, softeners and inorganic fillers. The elastomers may include polyisobutylene, isobutylene-isoprene copolymer, styrene butadiene rubber and natural latexes such as chicle. The resins may include polyvinylacetate and terpene resins. Low molecular weight polyvinylacetate is a preferred resin. Fats and oils may include tallow, soybean and cottonseed oils, hydrogenated and partially hydrogenated vegetable oils and cocoa butter. Commonly used waxes include paraffin, microcrystalline and natural waxes such as beeswax, candellia, carnauba and polyethylene wax. According to the preferred embodiment of the present invention, the insoluble gum base constitutes between about 5 and about 90 percent by weight of the gum. More preferably the insoluble gum base comprises between about 10 and about 50 percent by weight of the gum and most preferably between about 20 and about 35 percent by weight of the gum.

The gum base typically also includes a filler component. The filler component may be calcium carbonate, magnesium carbonate, talc, dicalcium phosphate and the like. The filler may constitute between about 5 and about 60 percent by weight of the gum base. Preferably, the filler comprises between about 5 and about 50 percent by weight of the gum base.

Gum bases typically also contain softeners, including glycerol monostearate and glycerol triacetate. Further, gum bases may also contain optional ingredients such as antioxidants, colors and emulsifiers. The present invention contemplates employing any commercially acceptable gum base.

The water-soluble portion of the chewing gum contains bulking and sweetening agents. In sugar gums, sucrose is typically both the bulking agent and the sweetening agent. Other sugar sweeteners include dextrose, maltose, dried invert sugar, fructose, levulose, galactose, corn syrup solids, glucose sugar and the like, alone or in combination. In sugarless gums, the bulking and sweetening agents usually include sorbitol, mannitol, xylitol, hydrogenated starch hydrolysates, maltitol and the like, alone or in combination. The bulking and sweetening agents usually comprise from about 30 to about 90 percent of the gum composition, and preferably from about 50 to about 80 percent.

High-intensity sweeteners may also be present and are commonly used with sugarless sweeteners. When used, high-intensity sweeteners typically constitute from about 0.001 to about 5 percent by weight of the chewing gum, preferably from about 0.01 to about 1 percent by weight of the chewing gum. Typically, high-intensity sweeteners are at least twenty times sweeter than sucrose. These may include, but are not limited to sucralose, aspartame, salts of acesulfame, alitame, saccharin and its salts, cyclamic acid and its salts, glycyrrhizin, dihydrochalcones, thaumatin, monellin and the like, alone or in combination.

The water-soluble portion of the chewing gum may further comprise softeners, flavoring agents and combinations thereof. Softeners are added to the chewing gum in order to optimize the chewability and mouth feel of the gum. The softeners, which are also known as plasticizers or plasticizing agents, generally constitute from about 0.5 to about 15 percent of the chewing gum. Softeners contemplated by the present invention include glycerin, lecithin and combinations thereof. Further, aqueous sweetener solutions such as those containing sorbitol, hydrogenated starch hydrolysates, corn syrup and combinations thereof may be used as softeners and binding agents in chewing gum.

The flavoring agent used in the gum may be present in an amount within the range of from about 0.1 to about 15 percent by weight of the chewing gum, preferably from about 0.2 to about 5 percent by weight of the chewing gum and most preferably from about 0.5 to about 3 percent by weight of the chewing gum. Flavoring agents may include essential oils, synthetic flavors or mixtures thereof, including but not limited to oils derived from plants and fruits such as citrus oils, fruit essences, peppermint oil, spearmint oil, other mint oils, clove oil, oil of wintergreen, cinnamon, anise and the like. Artificial flavoring agents and components are also contemplated for use in chewing gums of the present invention. Those skilled in the art will recognize that natural and artificial flavoring agents may be combined in any sensorally acceptable fashion. All such flavors and flavor blends are contemplated by the present invention. However, mint flavors appear to have the best enhancement by use of the present invention and thus are preferred. Most preferred is peppermint flavor. Peppermint flavor includes large amounts of menthol and menthone. It is believed that other flavor components that are polar in nature will also have their release enhanced by using the alginate materials.

Optional ingredients such as colors, emulsifiers and pharmaceutical agents may also be included in chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form by one of several methods, including rolling into sheets and cutting into sticks, extruding into chunks or casting into pellets.

Generally, the ingredients are mixed by first melting the gum base and adding it to the running mixer. The base may also be melted in the mixer itself. Color or emulsifiers may be added at this time. A softener such as glycerin may also be added at this time, along with syrup and a portion of the bulking agent. Further portions of the bulking agent may then be added to the mixer. The flavoring agent is typically added with the final portion of the bulking agent. The entire mixing procedure typically takes form 5 to 15 minutes, but longer mixing may sometimes be required.

In practicing the present invention, an alginate material selected from the group consisting of sodium alginate, carrageenan from red seaweed, propylene glycol alginate, sodium calcium alginate, ammonium alginate, calcium alginate and mixtures thereof is incorporated directly into the gum composition in a powder form, as opposed to being used as an encapsulant or an agglomerating agent for another gum ingredient. The addition of the alginate material to chewing gum in this particular manner results in release of some flavor components of the chewing gum more readily.

It has been discovered that when alginates are added to chewing gum at a low level of about 0.02% to about 1.0%, preferably 0.1 to 0.5% and most preferably 0.2%, some flavor components release more readily from gum as it is chewed. Alginates appear to affect the base affinity for some flavor ingredients and therefore modify the release rate. In gum formulas with and without alginates (described below), six chemicals in natural peppermint oil were analyzed during chewing release tests. Of these, menthol, menthone, limonene, and menthyl acetate released more readily from gum containing alginates, whereas alpha and beta pinene released more slowly from the gum.

Initially, 38 experimental ingredients were screened in laboratory gum samples. These ingredients included arabinogalactan, various carrageenans, agar-agar, various gelatins, gellan gum, various methyl celluloses, ethyl cellulose, various hydroxypropylmethyl celluloses, various pectins, hydroxypropyl cellulose, microcrystalline celluloses, cellulose acetate, and various types of alginates. Analysis for the six peppermint oil chemicals in gum bolus after 20 minutes of chewing were compared to an analysis of gum bolus after 20 minutes of chewing of a control gum without any additive. Six of the gums demonstrated enhanced flavor release. These six gums each contained one of the following ingredients:

1. PROTANAL LF 10/60, sodium alginate from brown seaweed, with a viscosity of 46.9 mPas for a 1% solution, from Pronova Biopolymer, Inc., 135 Commerce Way, Portsmouth, N.H.;
2. STAMERE HT, carrageenan from red seaweed, from Frutarom Meer Corporation, North Bergen, N.J.;
3. KELCOLOID LVF, propylene glycol alginate, which can be obtained from NutraSweet Kelco Co., San Diego, Calif.;
4. KELSET, self gelling sodium calcium alginate, which can be obtained from NutraSweet Kelco Co.;
5. PROTAMON S, ammonium alginate from brown seaweed, with a viscosity of 670 mPas for a 1% solution, from Pronova Biopolymer, Inc.; and
6. PROTANAL TXF 200, calcium alginate from brown seaweed, with a viscosity of 292 mPas for a 1% solution, from Pronova Biopolymer, Inc.

Analysis of gum bolus after 40 minutes of chewing was run on these six gums. Gums containing ingredients numbers 1–4 above showed enhanced flavor release. The addition of STAMERE HT carrageenan from red seaweed[1] increased the level of menthol released out of the gum after 40 minutes by 33%, as well as increased the released levels of menthone by 36% and limonene by 34%. KELCOLOID LVF propylene glycol alginate also showed an increased level of flavor release. The level of menthol increased by 24%, menthone by 49%, and limonene by 51% after 40 minutes of chewing. PROTANAL LF 10/60 sodium alginate increased the level of menthol released out of gum after 20 minutes by 53%, as well as increased the release of menthone by 49%. KELSET sodium calcium alginate increased the flavor release rate after 40 minutes of chewing, menthol by 23%, menthone by 31%, and limonene by 31%.

[1] It is noted that other carrageenans of the initially tested 38 ingredients were not found in these experiments to significantly increase flavor release. It is possible that these other carrageenan materials did not provide the same benefit because they were standardized with sugar.

Sensory effects are also noted for these flavor release properties. Flavors such as menthol, menthone, and eucalyptol give chewing gum its characteristic cooling flavor properties. When these flavors are released more easily, the sensory perception is that flavor is cooler and stronger. Menthol also has some bitter properties that also become stronger to make peppermint taste more bitter. As a result, the sensory impression is that alginates give chewing gum a stronger flavor and that it has more flavor. Analysis suggest that, in theory, more hydrophilic flavor components may be released faster with these alginates than hydrophobic flavor compounds.

A wide range of changes and modifications to the embodiments of the invention described above will be apparent to persons skilled in the art. The following examples are not to be construed as imposing limitations on the invention, but are included merely to illustrate preferred embodiments.

The gum formulation used to evaluate all 38 of the various carbohydrate test materials is the following:

|  | Comparative Example, % | Experimental Examples, % |
| --- | --- | --- |
| Base | 19.70 | 19.70 |
| Sugar | 54.65 | 54.45 |
| 45.5 Be' Syrup | 13.30 | 13.30 |
| Dextrose Monohydrate | 9.90 | 9.90 |
| Glycerin | 1.30 | 1.30 |
| Peppermint Flavor | 0.90 | 0.90 |
| Lecithin | 0.25 | 0.25 |
| Test Material |  | 0.20 |

Comparative and experimental gum samples were aged two weeks before sensory evaluation and release studies were made. Bench level sensory screening was done on the four samples that showed improved flavor release. Sensory results confirmed that the gums with the addition of STAMERE HT carrageenan from red seaweed and KELCOLOID LVF propylene glycol alginate demonstrated the highest level of flavor release. Sensory results also confirmed that PROTANAL LF 10/60 sodium alginate demonstrated some increase in flavor release and KELSET sodium calcium alginate had less flavor release, but all had more flavor release than the comparison example.

Not wishing to be bound by theory, it is believed that since the alginates and carrageenans are polar compounds compared to other gums and cellulose derivatives, they are effective in releasing flavor compounds. The flavor compounds that are released are the more polar flavors and may become bound to the polar alginates and carrageenans and be released from the non-polar gum base matrix.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in a respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A chewing gum product having increased flavor release comprising:
    a) about 5% to about 90% by weight gum base;
    b) about 5% to about 95% by weight bulking and sweetening agents;
    c) about 0.1% to about 15% by weight flavor; and
    d) about 0.02% to about 1% by weight of an alginate material selected from the group consisting of sodium alginate, carrageenan from red seaweed, propylene glycol alginate, sodium calcium alginate, ammonium alginate, calcium alginate and mixtures thereof, wherein said alginate material is incorporated directly into the chewing gum composition in a powder form and not as an encapsulant or an agglomerating agent.

2. The chewing gum product of claim 1 wherein the bulking and sweetening agents comprise sugar and glucose syrup.

3. The chewing gum product of claim 1 wherein the flavor is a mint flavor.

4. The chewing gum product of claim 3 wherein the mint flavor is peppermint.

5. The chewing gum product of claim 1 wherein said alginate material is sodium alginate from brown seaweed.

6. The chewing gum product of claim 1 wherein said alginate material is ammonium alginate from brown seaweed.

7. The chewing gum product of claim 1 wherein said alginate material is calcium alginate from brown seaweed.

8. The chewing gum product of claim 1 wherein said alginate material is present at a level of about 0.1% to about 0.5% by weight of the total gum product.

9. The chewing gum product of claim 1 wherein said alginate material is present at a level of about 0.2% by weight of the total gum product.

10. The chewing gum product of claim 1 wherein the chewing gum product is a sugarless chewing gum.

11. The chewing gum product of claim 10 wherein the flavor is a mint flavor.

12. The chewing gum product of claim 11 wherein the mint flavor is peppermint.

13. The chewing gum product of claim 12 wherein said alginate material is present at a level of about 0.1% to about 0.5% by weight of the total gum product.

14. The chewing gum product of claim 12 wherein said alginate material is present at a level of about 0.2% by weight of the total gum product.

15. The chewing gum product of claim 1 wherein the alginate material is selected from the group consisting of sodium alginate, carrageenan from red seaweed, propylene glycol alginate, sodium calcium alginate and mixtures thereof.

16. A method of increasing the release of flavor in a chewing gum composition comprising the step of adding an alginate material selected from the group consisting of sodium alginate, carrageenan from red seaweed, propylene glycol alginate, sodium calcium alginate, ammonium alginate, calcium alginate and mixtures thereof, in a powder form and not as an encapsulant or an agglomerating agent, directly into the chewing gum composition.

17. The method of claim 16 wherein the alginate material is selected from the group consisting of sodium alginate, carrageenan from red seaweed, propylene glycol alginate, sodium calcium alginate and mixtures thereof.

18. A method of making a chewing gum product with increased flavor release comprising the steps of:

a) forming a chewing gum composition comprising from about 5% to about 90% gum base, from about 5% to 95% bulking and sweetening agents and from about 0.1% to about 15% flavor; and b) adding from about 0.01% to about 1% of an alginate material selected from the group consisting of sodium alginate, carrageenan from red seaweed, propylene glycol alginate, sodium calcium alginate, ammonium alginate, calcium alginate and mixtures thereof in a powder form, and not as an encapsulant or an agglomerating agent, directly into the chewing gum composition.

19. The method of claim 18 wherein the alginate material is selected from the group consisting of sodium alginate, carrageenan from red seaweed, propylene glycol alginate, sodium calcium alginate and mixtures thereof.

* * * * *